Figure 1:
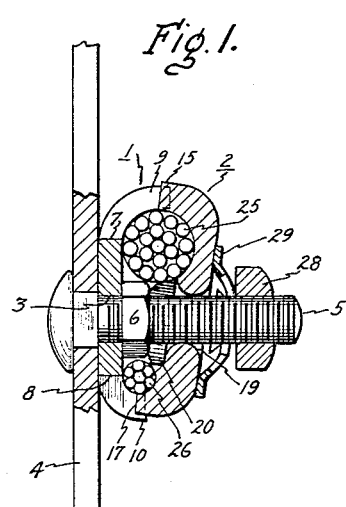

Sept. 4, 1956   R. W. STROBEL   2,762,027
ELECTRICAL CONDUCTOR CLAMP
Filed March 31, 1955

Inventor
Rudolph W. Strobel,
by Gilbert P. Tarleton
His Attorney.

_2,762,027_

Patented Sept. 4, 1956

2,762,027

ELECTRICAL CONDUCTOR CLAMP

Rudolph W. Strobel, Lenox, Mass., assignor to General Electric Company, a corporation of New York Application March 31, 1955, Serial No. 498,155

9 Claims. (Cl. 339—246)

This invention relates to a clamp, and more particularly, to an electrical terminal or clamp for connecting or clamping a wide size range of electrical conductors.

One well known prior art form of electrical clamp comprises two rather similar clamping plates positioned opposite to each other. Each of the plates has two lengthwise extending grooves or furrows formed in the inner face thereof opposite two similar grooves in the other plate. Each opposite pair of grooves in the pair of plates have roughly equal dimensions, and a comparatively narrow range of different sized electrical conductors are adapted to be received by said opposite pairs of grooves. A nut and bolt assembly, the bolt of which pierces the two clamping plates is used to securely clamp the electrical conductors between the clamping plates in their respective grooves.

It is an object of this invention to provide an electrical terminal or clamp which will clamp a larger range of different sized electrical conductors than possible with prior art electrical clamps.

When clamping electrical conductors, particularly stranded electrical conductors, it is very important that the clamp should circumferentially embrace the electrical conductor as much as possible. If this is not so the circumferential shape of the electrical conductor will be deformed when clamped and the strands will relax or work loose later making a poor electrical connection.

Accordingly, it is a further object of this invention to provide an electrical terminal or clamp wherein the electrical conductor is gripped circumferentially by the terminal or clamp.

In my invention the terminal or clamp comprises two plate members positioned opposite to each other. Four notches are formed in the periphery of one of the plates and these four notches define four lugs. In the inner face of said one plate are formed four grooves or furrows. Each one of the grooves extends across a different one of the lugs and across a pair of the four grooves. The other plate member has four lugs which extend from the plane thereof into the four notches in interlocking relationship with the four lugs of said one plate member. This interlocking lug relationship prohibits the two plate members from rotating with respect to each other and also aids in circumferentially clamping the electrical conductor to ensure that the strands thereof do not become loose. The four grooves have different sizes and said two plate members can be disposed in two different positions with respect to each other whereby a wider range of electrical conductors having different sizes can be clamped than possible with prior art clamps.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing.

Figure 2:
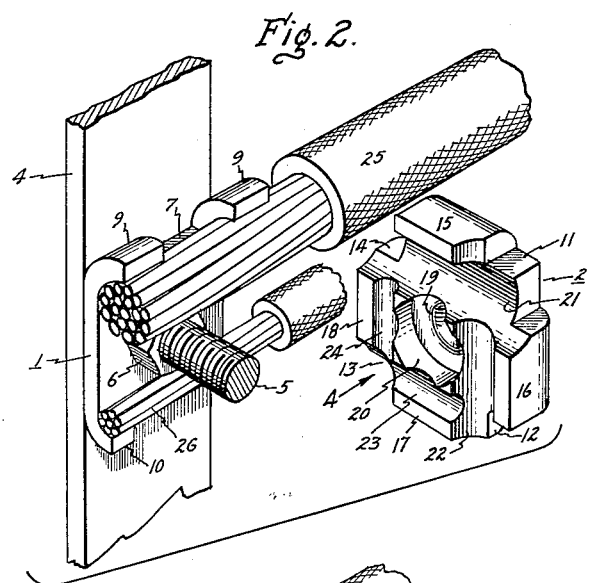
Figure 3:
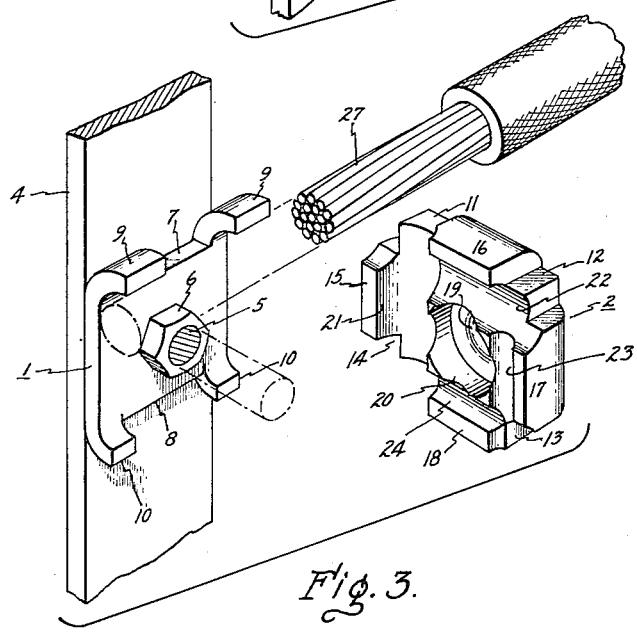
Figure 4:
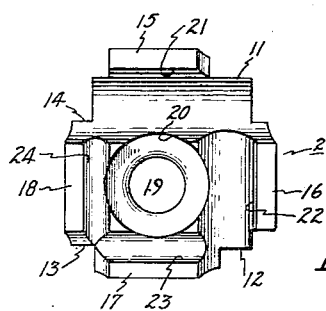

In the drawing Fig. 1 is a partly sectional view of a preferred form of my invention with a large and small sized electrical conductor clamped therein. Fig. 2 is a perspective view of said preferred form of invention prior to positioning of the top plate with respect to the bed plate. Fig. 3 is a perspective view of said preferred form of invention prior to positioning of the top plate with respect to the bed plate in a position different from that illustrated in Figs. 1 and 2 for the purpose of clamping still another size of electrical conductor. Fig. 4 is a view of the top plate viewed in the direction of arrow 4 of Fig. 2. Like reference numerals will be used throughout Figs. 1 to 4 to indicate identical parts.

Referring now to the drawing, shown therein is a clamp comprising two clamping plate members 1 and 2. The bed plate 1 has a central aperture 3 formed therein and is connected to a metallic strap 4 by a bolt 5 and nut 6. The bed plate 1 has a generally square flat configuration and in two opposite side edges thereof are formed notches 7 and 8. The notches 7 and 8 define lug portions 9 and 10 in the corners of the bed plate 1. The notch 7 is deeper and shorter than the notch 8 whereby the lugs 9 are larger than the lugs 10. The lugs 9 and 10 are turned up in a like direction away from the plane of the bed plate 1. The inner surfaces of the lugs 9 and 10 are concave, and the lugs 9 have a greater radius of curvature than the lugs 10.

The top plate 2 has a generally square flat configuration roughly equal in size to that of bed plate 1. The corners of top plate 2 have notches 11 to 14 formed therein and these four corner notches 11 to 14 define four central side edge lug portions 15 to 18 thereamongst. The top plate 2 has a central aperture 19 formed therein which has a diameter greater than that of bolt 5 whereby the bed plate 2 can be tilted slightly about bolt 5 with respect to bed plate 1. In the inside face of top plate 2 concentric with aperture 19 is formed a blind bore 20 which has a diameter slightly greater than that of nut 6 whereby the nut 6 will fit in blind bore 20. The depth of blind bore 20 is slightly greater than the height of nut 6 whereby the nut 6 will not prohibit the inside face of top plate 2 from making contact with the inside face of bed plate 1.

Also formed in the inner face of the top plate 2 are four concave grooves or furrows 21 to 24. Each one of grooves 21 to 24 extends across a different one of the lugs 15 to 18 between the corner notches defining said one lug in a direction generally parallel to the side edge of top plate 2 adjacent to said one lug. For instance, groove 21 traverses lugs 15 between notches 11 and 14 generally parallel to the top side edge of bed plate 2 when viewing Figs. 2 and 4. The grooves 21 to 24 are decreasingly smaller. That is, the radius of curvature of grooves 21 to 24 is progressively smaller.

Since the blind bore 20 receives the nut 6 and central aperture 19 receives the bolt 5, the blind bore 20 and nut 6 in conjunction with the central aperture 19 and bolt 5 locate the plates 1 and 2 with respect to each other. In the Figs. 1 and 2 position of the top plate 2 the outermost portion of lug 15 fits in notch 7 between lugs 9, and the lug 17 fits in notch 8 between lugs 10. That is, lugs 15 and 9 and lugs 17 and 10 are disposed with respect to each other in interlocking relationship whereby the plates 1 and 2 will not rotate with respect to each other. The large lugs 9 are disposed within the notches 11 and 14 and cooperate with the largest groove 21 as well as nut 6 and the inside face of bed plate 1 to circumferentially clamp and confine the strands of the large electrical conductor 25, and the small lugs 10 are disposed in the notches 12 and 13 and cooperate with the second smallest groove 23 as well as nut 6 and the inside face of bed plate 1 to circumferentially grip and confine the strands of the small electrical conductor 26.

In the Fig. 3 position the top plate 2 has been rotated in the same plane about 90° counterclockwise with respect to the Fig. 2 position. In such rotated position of top plate 2 the outermost portion of lug 16 fits in notch 7 between lugs 9, and the lug 18 fits in notch 8 between lugs 10. That is, lugs 16 and 9 and lugs 18 and 10 are disposed with respect to each other in interlocking relationship. The large lugs 9 are disposed within the notches 11 and 12 and cooperate with the second largest groove 22 as well as nut 6 and the inside face of bed plate 1 to circumferentially clamp and confine the strands of still another size electrical conductor 27, and the small lugs 10 are disposed in the notches 13 and 14 and cooperate with the smallest groove 24 as well as nut 6 and the inside surface of bed plate 1 to define another substantially cylindrical electrical conductor opening thereamongst. As illustrated in Figs. 1 and 2 and Fig. 3, my clamp can be used to clamp either two electrical conductors simultaneously or one electrical conductor singly within a very wide range.

It will be noted particularly from Fig. 4 that the corner notches 11 to 14 have particular configurations. The notches 11, 12, and 14 are two step notches whereas notch 13 is a single step notch. The two step notches 11 and 14 serve to increase the effective electrical conductor contact area of the concave groove 21 and the two step notch 12 serves to increase the effective electrical conductor contact area of the concave groove 23. A greater effective electrical conductor contact area is desirable in the grooves 21 and 22 since these grooves are adapted to clamp relatively large electrical conductors which will carry relatively large currents. Similarly, the lugs 9 have greater concave inner surfaces and radius of curvatures than the lugs 10 since the former are adapted to make contact with relatively large electrical conductors.

The top plate 2 can be positioned with respect to the bed plate 1 only in the two illustrated positions for several reasons. The notch 7 will receive the outer portions of the lugs 15 and 16 and the notch 8 will receive the lugs 17 and 18. The notch 8 will also receive the outer portions of lugs 15 and 16 since notch 8 is larger than notch 7, but notch 7 will not receive the lugs 17 and 18 since lugs 17 and 18 have a width greater than the width of the outer portions of lugs 15 and 16 and the length of notch 7. Additionally, it will be noted that the axis of aperture 19 is slightly off-center with respect to the true center of top plate 2 towards the corner notch 13 when viewing Fig. 4. The same is true of the lugs 17 and 18 and the outer portions of the lugs 15 and 16. Accordingly, when the top plate is rotated in the same plane about 90° counterclockwise from the position illustrated in Fig. 3 the extensions of the groove 21 will catch on the lugs 10 and prohibit the outer portion of lug 15 from entering the notch 8 since the total length of the groove 21 is greater than the length of notch 8. Similarly, when the top plate is rotated in the same plane about 180° counterclockwise from the position illustrated in Fig. 3 the extension of the groove 22 and the right-hand extension of the groove 21 when viewing Fig. 4 will catch on the lugs 10 and prohibit the outer portion of lug 16 from entering the notch 8 since the total length of the groove 22 plus the width of said right-hand extension of groove 21 is greater than the length of notch 8.

The plates 1 and 2 preferably are made by machining or casting from copper alloys such as brass or bronze. Also, the plates 1 and 2 preferably are tin plated since my clamp is adapted to clamp aluminum as well as copper electrical conductors. As will be obvious to those skilled in the art, if aluminum is clamped directly to a copper alloy surface galvanic corrosion will occur therebetween. The electrical conductors are firmly clamped by a nut 28 on the outer threaded end of the bolt 5. Positioned between the nut 28 and top plate 2 is a resilient lock washer or spring element 29 to provide a follow-up clamping action in the event the electrical conductors should eventually work loose. Such resilient follow-up clamping action is particularly useful when clamping aluminum conductors which are subject to gradual cold flow or deformation after being initially securely clamped. In the event an aluminum conductor clamped in my clamp experiences cold flow, the compressed spring element 29 will drive the top plate 2 further towards the bed plate 1 to take up any slack.

While there has been shown and described a particular embodiment of the invention, it will be obvious to those skilled in the art that changes and modifications may be made without departing from the invention, and it is intended by the appended claims to cover all such changes and modifications as fall within the true spirit and scope of the invention.

What I claim as new and desire to secure by Letters Patent of the United States is:

1. An electrical conductor clamp comprising two generally square oppositely facing plates, one of said plates having a notch formed in two opposite side edges thereof whereby a lug is defined adjacent each corner of said one plate, said corner lugs being turned up from said one plate in a like direction, the other of said plates having a notch formed adjacent each corner thereof whereby a lug is defined along each side edge of said other plate, one face of said other plate having four grooves formed therein, each one of said four grooves traversing a different one of said side edge lugs in a direction generally parallel to the plate side edge thereof, each pair of said upturned corner lugs on said one plate opposite side edges adapted to receive two different side edge lugs therebetween.

2. An electrical conductor clamp comprising two generally flat square clamping plates superposed with respect to each other, one of said plates having a notch formed in each corner thereof, said four corner notches defining four side edge lugs in said one plate, four grooves formed in the inner face of said one plate, each one of said grooves extending across a different one of said side edge lugs between the pair of corner notches defining said one side edge lug, the other of said plates having a notch formed in two opposite side edges thereof defining four lugs in each corner of said other plate, said corner lugs extending from said other plate into said corner notches, an aperture formed adjacent the central portions of each of said plates, and fastening means extending through said apertures.

3. An electrical conductor clamp comprising a pair of generally flat square superposed clamping plates, one of said plates having a notch in each corner thereof, said corner notches defining four lugs in said one plate, the inner face of said one plate having four grooves therein, each one of said grooves extending across a different one of said lugs between the pair of notches defining said one lug, each one of said grooves having a different depth, the other of said plates having a lug extending from each corner thereof into said corner notches.

4. An electrical conductor clamp comprising a pair of generally square superposed plate members, one of said plate members having four lug portions, each one of said lug portions extending from a different side edge of said one plate member, the inner face of said one plate member having four grooves therein, each one of said grooves extending across a different one of said lug portions generally parallel to the one plate member side edge corresponding to said one lug portion, the other of said plates having four lug portions extending from the corners thereof between each adjacent pair of said four side edge lug portions.

5. An electrical conductor clamp comprising a pair of generally square superposed plate members, one of said plate members having four lug portions, each one of said lug portions extending from a different side edge of said one plate member, the inner face of said one plate member having four grooves therein, each one of said grooves extending across a different one of said lug portions generally parallel to the one plate member side edge corresponding to said one lug portion, said grooves having different sizes, the other of said plates having four lug portions extending from the corners thereof between each adjacent pair of said four side edge lug portions.

6. An electrical conductor clamp comprising a pair of generally square superposed plate members, one of said plate members having four lug portions, each one of said lug portions extending radially from a different side edge of said one plate member, the inner face of said one plate member having four grooves therein, each one of said grooves extending across a different one of said lug portions generally parallel to the one plate member side edge corresponding to said one lug portion, said grooves having different sizes, the other of said plates having four lug portions extending from the corners thereof between each adjacent pair of said four side edge lug portions, and an aperture extending through each of said plate members, and fastening means extending through said apertures.

7. An electrical conductor clamp comprising two generally square plate members facing each other, one of said plate members having a notch in each corner thereof, said corner notches defining four side edge lug portions in said one plate member, four concave grooves formed in the inner face of said one member, each of said grooves extending across a different one of said side edge lug portions generally parallel to the one plate member side edge adjacent said one side edge lug portion, the other of said plate members having a notch in two opposite side edges thereof defining lug portions in the four corners of said other plate members, said corner lug portions extending from the plane of said other plate member into said corner notches interlocking relationship with said side edge lug portions, the inner face of said corner lug portions being concave.

8. A clamp comprising two plate members disposed opposite to each other, one of said members having four notches formed in the outer circumference thereof, said four notches defining four lug portions thereamongst, four grooves formed in the side of said one member facing the other of said members, each one of said grooves extending across a different one of said lug portions between the pair of notches defining said one lug portion, said other member having four lug portions extending from adjacent the circumference thereof into said four notches.

9. An electrical conductor clamp comprising two generally square approximately equal sized plate portions disposed opposite to each other, the face of one of said plate portions facing the other of said plate portions having a groove formed therein adjacent to and extending generally parallel to each of the side edges of said one plate, portion, an aperture formed in said one plate portion between said grooves, said one plate portion having a notch formed in each corner thereof, said other plate portion having a notch formed in two opposite side edges thereof whereby four lugs are defined in the corners of said other plate portion, said four lugs extending from the plane of said other plate portion into said corner notches, said grooves having different sizes whereby in one position of said one plate portion with respect to said other plate portion said corner lugs define two different sized electrical conductor receiving channels with two of said four grooves and in another position of said one plate portion rotated about 90° from said one position define another two different sized electrical conductor receiving channels with the other two of said four grooves.

References Cited in the file of this patent
UNITED STATES PATENTS

| | | |
|---|---|---|
| 1,044,717 | Wieberg | Nov. 19, 1912 |
| 1,489,835 | Kietz | Apr. 8, 1924 |